(12) United States Patent
Balamane et al.

(10) Patent No.: US 8,976,489 B2
(45) Date of Patent: Mar. 10, 2015

(54) NOBLE METAL SURROUNDED MAGNETIC LIP AND HEAT SINK FOR HEAT ASSISTED MAGNETIC RECORDING HEAD

(71) Applicant: HGST Netherlands B.V., Amsterdam (NL)

(72) Inventors: Hamid Balamane, Portola Valley, CA (US); Vijay Prakash Singh Rawat, San Jose, CA (US); Matteo Staffaroni, Pleasanton, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/906,777

(22) Filed: May 31, 2013

(65) Prior Publication Data

US 2014/0355400 A1    Dec. 4, 2014

(51) Int. Cl.
G11B 5/187    (2006.01)
G11B 5/31    (2006.01)

(52) U.S. Cl.
CPC ............... *G11B 5/187* (2013.01); *G11B 5/313* (2013.01)
USPC ........................................................ 360/125.3

(58) Field of Classification Search
CPC .............................. G11B 5/314; G11B 5/6088
USPC ............... 360/125.03, 125.06, 125.07, 125.3, 360/125.31, 125.32; 369/112.27, 13.02, 369/13.32, 13.33
See application file for complete search history.

(56) References Cited

U.S. PATENT DOCUMENTS

| | | | |
|---|---|---|---|
| 6,898,054 B2 | 5/2005 | Kawasaki et al. | |
| 7,193,817 B2 | 3/2007 | Lille | |
| 7,391,590 B2 | 6/2008 | Matono et al. | |
| 7,652,954 B2 * | 1/2010 | Fontana et al. | 369/13.13 |
| 7,748,104 B2 | 7/2010 | Bonhote et al. | |
| 8,169,881 B2 | 5/2012 | Balamane et al. | |
| 8,259,540 B1 | 9/2012 | Sahoo et al. | |
| 8,339,739 B2 | 12/2012 | Balamane et al. | |
| 8,456,965 B2 * | 6/2013 | Naniwa et al. | 369/13.33 |
| 8,498,182 B1 * | 7/2013 | Balamane et al. | 369/13.33 |
| 8,593,916 B2 * | 11/2013 | Ikai et al. | 369/13.33 |
| 2007/0230047 A1 * | 10/2007 | Jin et al. | 360/126 |
| 2007/0230048 A1 * | 10/2007 | Hasegawa | 360/126 |
| 2010/0128578 A1 * | 5/2010 | Kato et al. | 369/13.24 |
| 2010/0165802 A1 * | 7/2010 | Stipe | 369/13.13 |
| 2011/0235480 A1 * | 9/2011 | Goulakov et al. | 369/13.35 |
| 2012/0045662 A1 | 2/2012 | Zou et al. | |
| 2012/0075965 A1 | 3/2012 | Tanaka et al. | |
| 2012/0105996 A1 | 5/2012 | Katine et al. | |

OTHER PUBLICATIONS

Balamane et al.: U.S. Appl. No. 13/490,283 entitled "Wrap-Around Antenna Design for Improved Performance in Thermally-Assisted Magnetic Recording" filed Jun. 6, 2012.

* cited by examiner

*Primary Examiner* — Angel Castro
(74) *Attorney, Agent, or Firm* — Patterson & Sheridan, LLP (57) ABSTRACT

The embodiments of the present invention generally relate to a magnetic head having a magnetic lip. The vertical sides and the bottom of the magnetic lip are covered by one or more conductive layers. In one embodiment, the bottom of the magnetic lip is covered by a first conductive layer and the vertical sides of the magnetic lip are covered by a second conductive layer. The conductive layers are made of a material that would not react with oxygen, thus no oxide films are formed on the vertical sides and the bottom of the magnetic lip during the manufacturing of the magnetic head.

7 Claims, 7 Drawing Sheets

NOBLE METAL SURROUNDED MAGNETIC LIP AND HEAT SINK FOR HEAT ASSISTED MAGNETIC RECORDING HEAD

BACKGROUND

1. Field

Embodiments of the present mention generally relate to data storage systems, and more particularly, to write heads for thermally assisted recording.

2. Description of the Related Art

Higher storage bit densities in magnetic media used in disk drives have reduced the size (volume) of magnetic bits to the point where the magnetic bit dimensions are limited by the grain size of the magnetic material. Although grain size can be reduced further, the data stored within the magnetic bits may not be thermally stable. That is, random thermal fluctuations at ambient temperatures may be sufficient to erase data. This state is described as the superparamagnetic limit, which determines the maximum theoretical storage density for a given magnetic media. This limit may be raised by increasing the coercivity of the magnetic media or by lowering the temperature. Lowering the temperature may not always be practical when designing hard disk drives for commercial and consumer use. Raising the coercivity, on the other hand, requires write heads that incorporate higher magnetic moment materials, or techniques such as perpendicular recording (or both).

One additional solution has been proposed, which uses heat to lower the effective coercivity of a localized region on the magnetic media surface and writes data within this heated region. The data state becomes "fixed" once the media cools to ambient temperatures. This technique is broadly referred to as "thermally assisted (magnetic) recording" (TAR or TAMR), "energy assisted magnetic recording" (EAMR), or "heat-assisted magnetic recording" (HAMR) which are used interchangeably herein. It can be applied to longitudinal and perpendicular recording systems as well as "bit patterned media". Heating of the media surface has been accomplished by a number of techniques such as focused laser beams or near-field optical sources.

While the laser beam or the near-field optical source is positioned to induce heating in the magnetic media, a certain percentage of heat will also be generated in the magnetic head. This heating can affect the shape of the head at the air bearing surface (ABS), and therefore impact the fly height. Heating of the head can also impact the reliability and performance of the head because high temperatures can accelerate thermal migration of various films and structures, causing inter-diffusion and dimensional smearing.

The primary areas of the HAMR head that get hot are the antenna and the magnetic lip. The antenna material is comprised of noble metals with low melting point and hence can show morphological changes with heating. The magnetic lip material is comprised of alloy of (Co, Fe, Co, Ni, Cr) and with increase in temperature under operational conditions can degrade due to severe oxidation. Thus, an efficient heat transfer path is needed from both the near field transducer (NFT) and the magnetic lip to the heat sink(s). A critical component to ensure efficient heat transfer is elimination of thermal impedance at the interfaces formed during integration of different materials to fabricate the NFT, magnetic lip and the heat sink(s). The interfaces generated during the fabrication process get exposed to atmosphere and are oxidized thus leading to high interface thermal impedance. Therefore, there is a need in the art for an improved recording head for HARM.

SUMMARY OF THE INVENTION

Embodiments of the present invention generally relate to a magnetic head having a magnetic lip. The vertical sides and the bottom of the magnetic lip are covered by one or more conductive layers. In one embodiment, the bottom of the magnetic lip is covered by a first conductive layer and the vertical sides of the magnetic lip are covered by a second conductive layer.

In one embodiment, a heat assisted magnetic recording head is disclosed. The heat assisted magnetic recording head includes an antenna, an aperture disposed over the antenna covering a portion of the antenna, a first conductive layer disposed over the antenna and the aperture, a magnetic lip disposed over the first conductive layer, a second conductive layer disposed over the first conductive layer and over vertical sides of the magnetic lip, a heat sink disposed over the second conductive layer, and a write pole disposed over the heat sink, the second conductive layer and the magnetic lip.

In another embodiment, a heat assisted magnetic recording head is disclosed, The heat assisted magnetic recording head includes an antenna, an aperture disposed over the antenna covering a portion of the antenna, a magnetic lip disposed over the aperture covering a portion of the aperture, a first conductive layer disposed between the magnetic lip and the aperture and over vertical sides of the magnetic lip, a second conductive layer disposed over the antenna, vertical sides and a top surface of the aperture not covered by the first conductive layer, and vertical sides of the first conductive layer, a heat sink disposed over the second conductive layer, and a write pole disposed over the heat sink, the first conductive layer, the second conductive layer and the magnetic lip.

In another embodiment, a heat assisted magnetic recording head is disclosed. The heat assisted magnetic recording head includes an antenna, an aperture disposed over the antenna covering a portion of the antenna, a first conductive layer disposed over the aperture, a magnetic lip disposed over the first conductive layer covering a first portion of the first conductive layer, a second conductive layer disposed over the antenna, vertical sides of the aperture, a second portion of the first conductive layer, and vertical sides of the magnetic lip, a heat sink disposed over the second conductive layer, and a write pole disposed over the heat sink, the second conductive layer and the magnetic lip.

In another embodiment, a method for forming a heat assisted magnetic recording head is disclosed. The method includes depositing a first conductive layer over a substrate having an optical transducer. The optical transducer has an aperture disposed over an antenna and the first conductive layer is deposited over the antenna and a top surface and vertical sides of the aperture. The method further includes depositing a resist over a first portion of the first conductive layer. A second conductive layer is deposited over the second portion of the first conductive layer and vertical sides of the resist. The method further includes depositing a heat sink over the second conductive layer, removing a portion of the heat sink and the second conductive layer disposed on the top surface of the resist to expose the resist, and removing the exposed resist to form an opening in the heat sink. A bottom of the opening is covered by the first conductive layer and vertical sides of the opening are covered by the second conductive layer. The method further includes depositing a magnetic material within the opening.

In another embodiment, a method for forming a heat assisted magnetic recording head is disclosed. The method includes depositing a resist over a substrate having an optical transducer. The optical transducer has an aperture disposed over an antenna and the resist is deposited over a first portion of the aperture. The method further includes depositing a first conductive layer over the antenna, vertical sides and a second portion of the aperture and a top surface and vertical sides of the resist, depositing a heat sink over the first conductive layer, removing a portion of the heat sink and the first conductive layer disposed over the top surface of the resist to expose the resist, and removing the exposed resist to form an opening in the heat sink. The vertical sides and the bottom of the opening are covered by the first conductive layer. The method further includes depositing a second conductive layer within the opening and depositing a magnetic material over the second conductive layer.

In another embodiment, a method for forming a heat assisted magnetic recording head is disclosed. The method includes depositing an insulating layer over a substrate having an antenna. An opening is formed in the antenna and the insulating layer is deposited within the opening and over the antenna. The method further includes depositing a first conductive layer over the insulating layer, removing a portion of the first conductive layer and the insulating layer to expose a portion of the antenna, depositing a resist over a first portion of the first conductive layer, depositing a second conductive layer over the exposed portion of the antenna, vertical sides of the insulating layer, a second portion of the first conductive layer and a top surface and vertical sides of the resist, depositing a heat sink over the second conductive layer, and removing the exposed resist to from an opening in the heat sink. The bottom of the opening is covered by the first conductive layer and vertical sides of the opening are covered by the second conductive layer. The method further includes depositing a magnetic material within the opening.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments of the present invention generally relate to a magnetic head having a magnetic lip. The vertical sides and the bottom of the magnetic lip are covered by one or more conductive layers. In one embodiment, the bottom of the magnetic lip is covered by a first conductive layer and the vertical sides of the magnetic lip are covered by a second conductive layer.

Figure 1A:
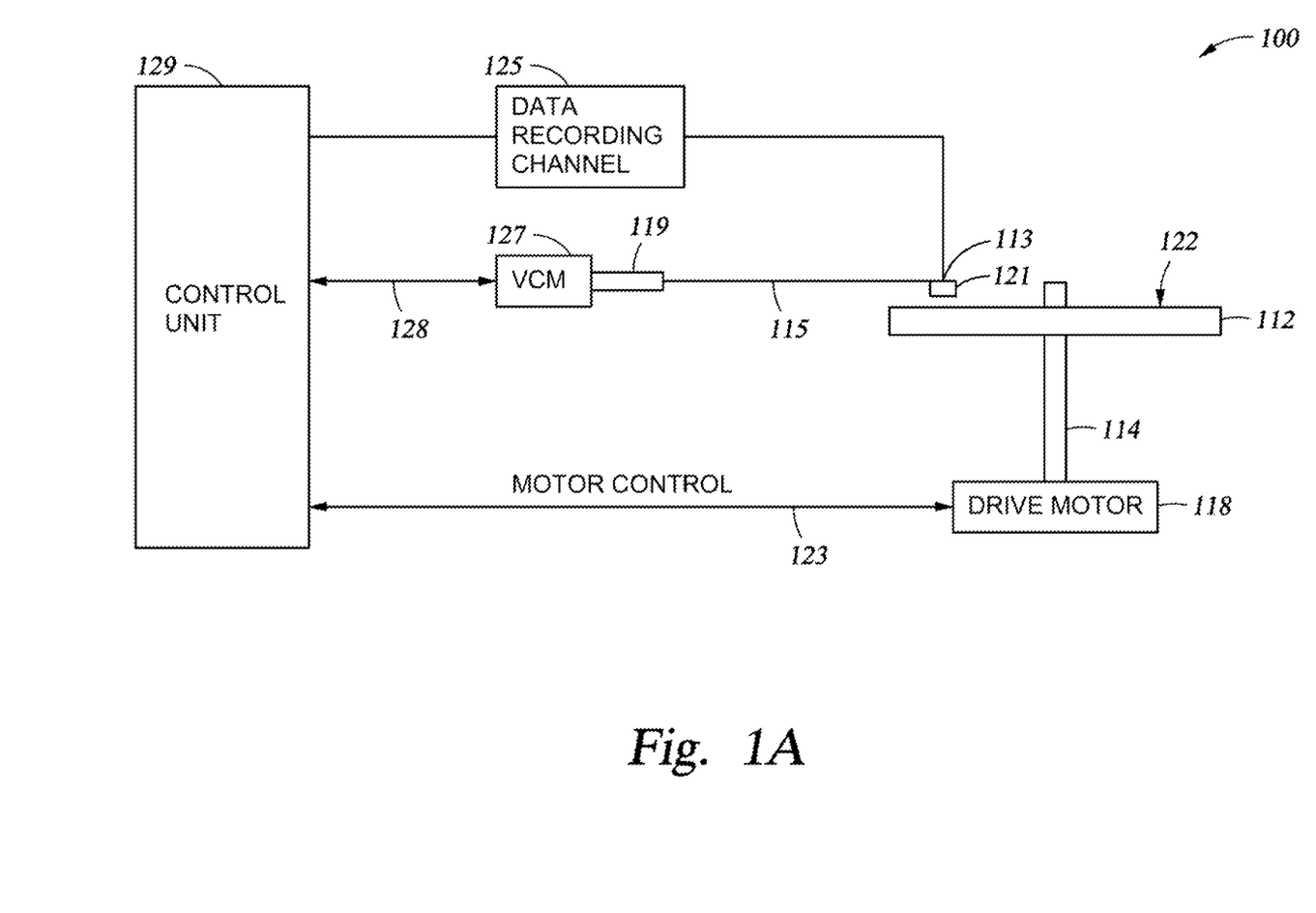
FIGS. 1A-1B illustrate a disk drive system, according to embodiments described herein.

FIG. 1A illustrates a disk drive embodying this invention. As shown, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121 that may include a radiation source (e.g., a laser or electrically resistive heater) for heating the disk surface 122. As the magnetic disk rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases the slider 113 towards the disk surface 122. Each actuator arm 119 is attached to an actuator means 127. The actuator means 127 as shown in FIG. 1A may be a voice coil motor (VCM). The VCM comprises a coil movable within a fixed magnetic field, the direction and speed of the coil movements being controlled by the motor current signals supplied by control unit 129.

During operation of a TAR or HAMR enabled disk drive 100, the rotation of the magnetic disk 112 generates an air bearing between the slider 113 and the disk surface 122 which exerts an upward force or lift on the slider 113. The air bearing thus counter-balances the slight spring force of suspension 115 and supports slider 113 slightly above the disk 112 surface by a small, substantially constant spacing during normal operation. The radiation source heats up the high-coercivity media so that the write elements of the magnetic head assemblies 121 may correctly magnetize the data bits in the media.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic disk storage system and the accompanying illustration of FIG. 1A are for representation purposes only. It should be apparent that disk storage systems may contain a large number of disks and actuators, and each actuator may support a number of sliders.

Figure 1B:
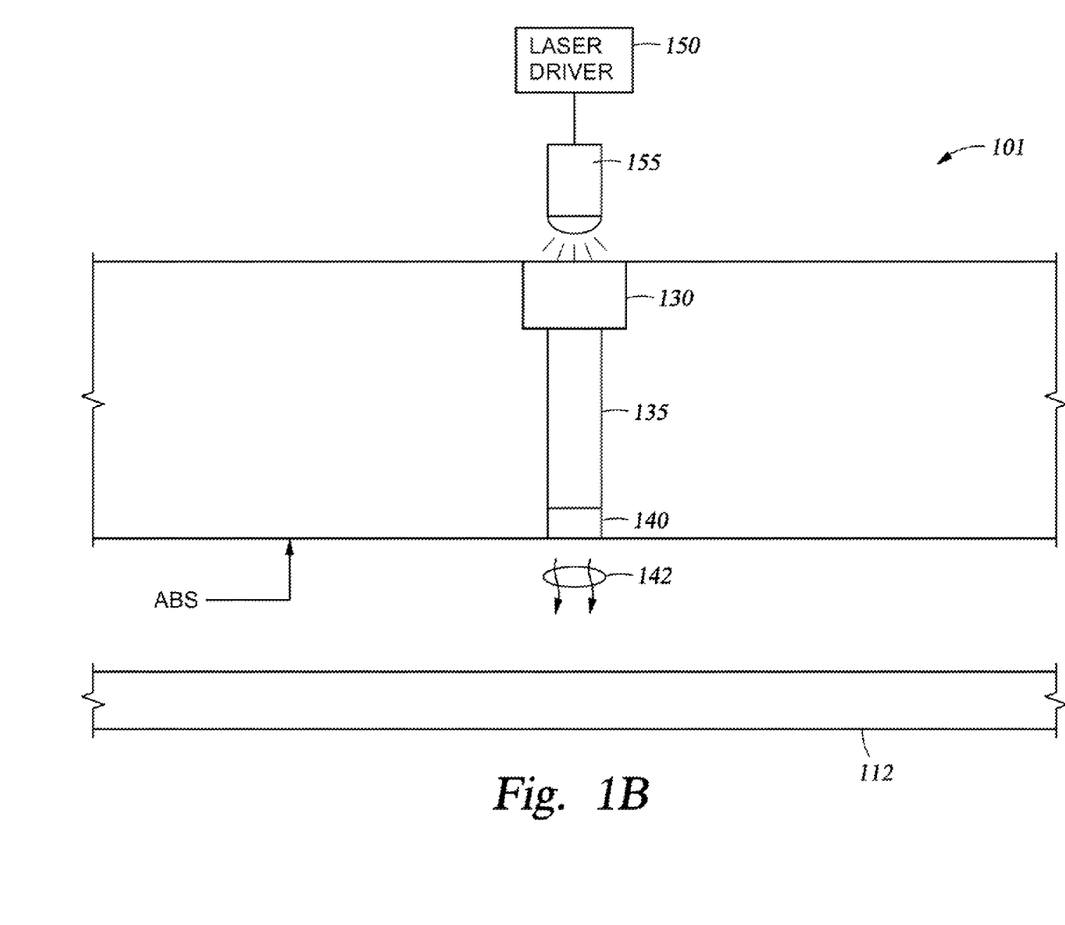

FIG. 1B is a cross sectional schematic of a TAR enabled write head 101, according to one embodiment described herein. The head 101 is operatively attached to a laser 155 (i.e., a radiation source) that is powered by a laser driver 150. The laser 155 may be placed directly on the head 101 or radiation may be delivered from a laser 155 located separate from the slider through an optical fiber or waveguide. Similarly, the laser driver 150 circuitry may be located on the slider 113 or on a system-on-chip (SOC) associated with the disk drive 100 such as the control unit 129 as shown in FIG. 1A. The head 101 includes a spot-size converter 130 for focusing the radiation transmitted by the laser 155 into the waveguide 135. In another embodiment, the head 101 may include one or more lens for focusing the beamspot of the laser 155 before the emitted radiation reaches the spot-size converter 130. The waveguide 135 is a channel that transmits the radiation through the height of the head 101 to a NFT 140—e.g., a plasmonic device or optical transducer—which is located at or near the air-bearing surface (ABS). The NFT 140 further focuses the beamspot to avoid heating neighboring tracks of data on the disk 112—i.e., creates a beamspot much smaller than the diffraction limit. As shown by arrows 142, this optical energy emits from the NFT 140 to the surface of the disk 112 below the ABS of the head 101. The embodiments herein, however, are not limited to any particular type of radiation source or technique for transferring the energy emitted from the radiation source to the ABS.

Figure 2:
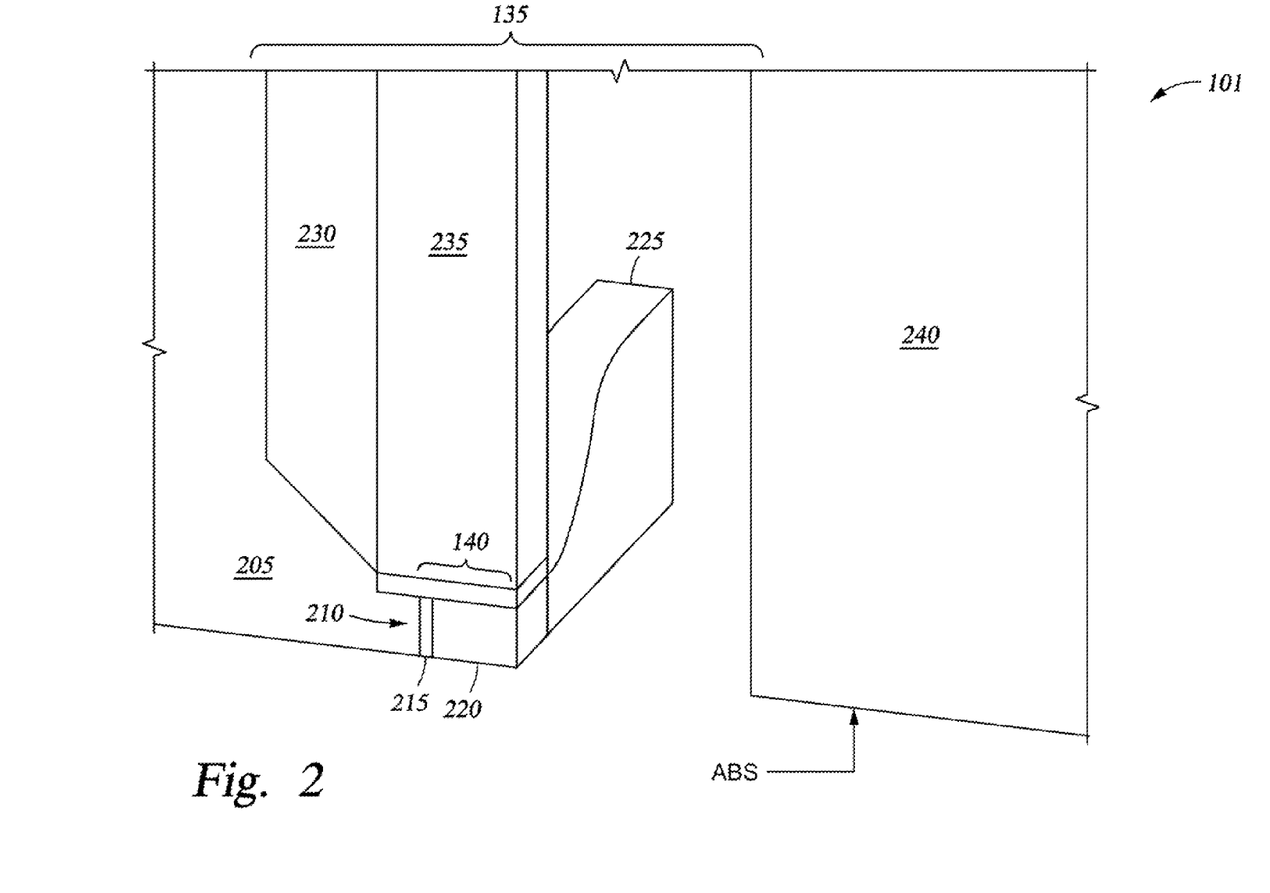
FIG. 2 illustrates a cross-sectional schematic diagram of a TAR enabled head, according to one embodiment described herein.

FIG. 2 illustrates a cross-sectional schematic diagram of the TAR enabled head 101, according to one embodiment of the invention. As shown, this portion of the head 101 includes the waveguide 135 but with some of the cladding 230 (and any cladding on the back-side of the head 101) removed to better illustrate the details of heat sink 225. The NFT 140 may be directly or thermally coupled to the heat sink 225 for removing excess heat from the NFT 140. Because FIG. 2 is a cross-section of head 101, there may be another heat sink located opposite the heat sink 225 depicted. The return pole 240 is located between the NFT 140 and shield layers or the read pole which are not shown in this figure.

In one embodiment, the write pole 205 includes a magnetic lip 210 portion that may extend underneath the core 235 of the waveguide 135. The magnetic flux generated by this lip 210 may aid the ability of the NFT 140 to focus the optical energy onto the magnetic media.

The core 235 (and the waveguide 135) may terminate at the NFT 140. The NFT 140 at least includes an antenna 220 and an aperture 215. In some embodiments, because the design and/or material of the pole lip 210 may improve the efficiency of the antenna 220, the pole lip 210 may be considered as part of the NFT 140. The antenna 220 may be Cu, Au, Ag, Al, Rh, or alloys thereof. The aperture 215 is an opening that may be filled with low refractive index and optically transparent material such as, for example, $SiO_2$ or other dielectric material. In one embodiment, the aperture 215 may comprise of the same material as the cladding 230. The write pole 205 and pole lip 210 may comprise of Ni, Co, Fe, Cr, or some combination or alloy thereof. The NFT 140 uses the antenna 220 and aperture 215 to further focus the optical energy delivered by the waveguide 135 onto the magnetic media.

The heat generated in the NFT 140 may be dissipated by the heat sink 225. During the manufacturing of the head 101, multiple process steps may be performed in different process chambers, which may result in formation of oxide films at various interfaces. These oxide films may have poor thermal conductivity, and may reduce the thermal conductance across the interfaces. Embodiments of the present invention provide an improved head that does not have oxide films formed at the interfaces of the pole lip 210. The improved head has the pole lip 210 having vertical sides and a bottom surrounded by one or more conductive layers made of a noble metal, which would not react with oxygen to form an oxide film on the vertical sides and the bottom of the pole lip 210.

Figure 3A:
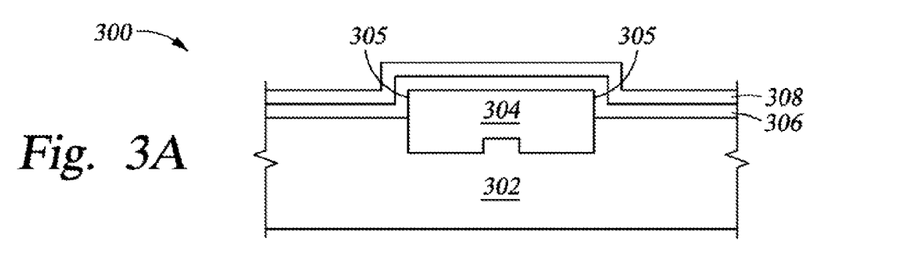
FIGS. 3A-3D are ABS views of a magnetic head at different processing stages according to one embodiment of the invention.

FIGS. 3A-3D are ABS views of a magnetic head 300 at different processing stages according to one embodiment of the invention. FIG. 3A shows an antenna 302 and an aperture 304. The antenna 302 may be the antenna 220 in FIG. 2 and the aperture 304 may be the aperture 215 in FIG. 2. In one embodiment, the antenna 302 is comprised of Au and the aperture 304 is comprised of $SiO_2$. The antenna 302 and the aperture 304 may have various shapes. In one embodiment, the antenna 302 may have a shape that looks like the letter "E" rotated 90 degrees in counter clockwise direction. The aperture 304 is disposed on the antenna 302 and may have a shape that looks like the letter "C" rotated 90 degrees in the clockwise direction.

A conductive layer 308 is deposited over the antenna 302 and the aperture 304. The conductive layer 308 may also cover the exposed vertical sides 305 of the aperture 304. The conductive layer 308 may have good thermal conductivity and may be made of a noble metal, such as Au, Rh, Ru, Ir, Pd, Pt, Re, or Os. The conductive layer 308 may also be an alloy having over 95% of one of the noble metals, such as Au, Rh, Ru, Ir, Pd, Pt, Re, or Os. The thickness of the conductive layer 308 may be less than or equal to 10 nm. In one embodiment, the thickness of the conductive layer 308 is about 5 nm. The conductive layer 308 may be formed using any suitable deposition process, such as atomic layer deposition (ALD).

The conductive layer 308 may not have good adhesion to the aperture 304, thus, a seed layer 306 may be first deposited over the antenna 302 and the aperture 304, and the conductive layer 308 is then deposited on the seed layer 306. The seed layer 306 may be any suitable material, such as Ta, NiTa, Cr, Ti or Si. In one embodiment, the seed layer 306 is about 1 nm thick.

Figure 3B:
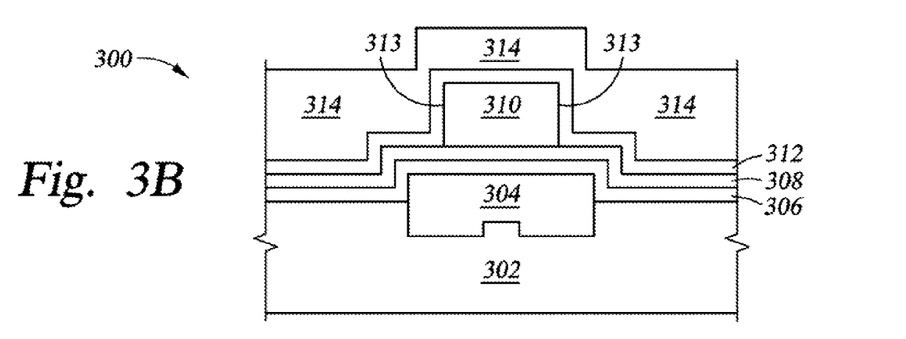

Next, as shown in FIG. 3B, a resist 310 is deposited over the conductive layer 308 and a second conductive layer 312 is deposited over the conductive layer 308 and the resist 310. The resist 310 ma be deposited and patterned using any suitable processes. The second conductive layer 312 may also cover vertical sides 313 of the resist 310. The second conductive layer 312 may also have good thermal conductivity and may be made of a noble metal, such as Au, Rh, Ru, Ir, Pd, Pt, Re, or Os. The second conductive layer 312 may also be an alloy having over 95% of one of the noble metals, such as Au, Rh, Ru, Ir, Pd, Pt, Re, or Os. Any suitable deposition process may be used to deposit the second conductive layer 312, and one example of such process is ALD. The second conductive layer 312 may have a thickness of less than or equal to 10 nm. In one embodiment, the thickness of the second conductive layer is about 2 nm.

In one embodiment, the second conductive layer 312 comprises the same material as the conductive layer 308. In another embodiment, the second conductive layer 312 comprises a different material as the conductive layer 308. A second seed layer (not shown) may be optionally deposited over the conductive layer 308 and the resist 310, and the second conductive layer 312 is deposited on the second seed layer. Next, a heat sink 314 is deposited over the second conductive layer 312. The heat sink 314 is made of a material having good thermal conductivity, such as Cr, Ir, Pt, Pd, Ru, or Rh, and is deposited using any suitable deposition process, such as physical vapor deposition (PVD).

Figure 3C:
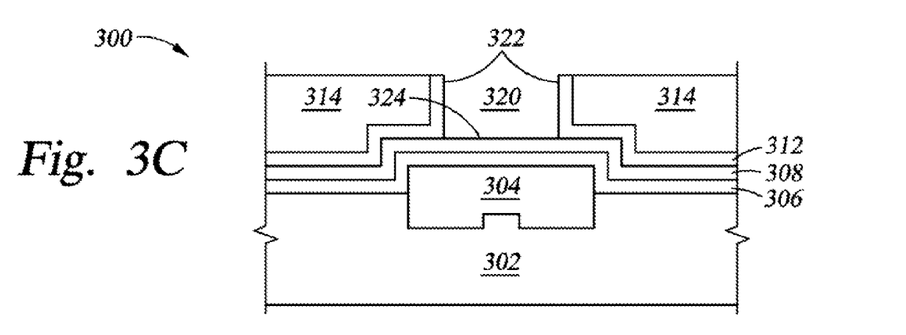

One or more removal processes are performed to form an opening 320, as shown in FIG. 3C. Portions of the heat sink 314 and the second conductive layer 312 covering the top surface of the resist 310 are first removed to expose the top surface of the resist 310 by any suitable removal process, such as ion milling. Then the resist 310 is removed by any suitable removal process, such as wet stripping. The opening 320 has vertical sides 322 and a bottom 324. The vertical sides 322 are the second conductive layer 312 and the bottom 324 is the conductive layer 308. Because both conductive layers 308, 312 may be a noble metal or an alloy of a noble metal, no oxidation may occur at the vertical sides 322 and the bottom 324 of the opening 320. Therefore, no oxide films may be formed on the vertical sides 322 and the bottom 324 of the opening 320 as the magnetic head 300 at the current processing stage is exposed to oxygen.

Figure 3D:
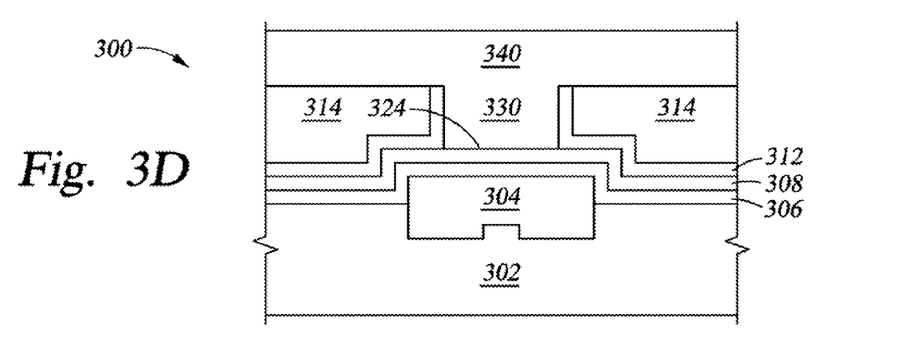

A magnetic material is deposited in the opening 320 and over the beat sink 314, as shown in FIG. 3D. The portion of the magnetic material that is in the opening 320 is the pole lip 330 and the portion of the magnetic material that is over the heat sink 314 and the pole lip 330 is the write pole 340. The pole lip 330 and the write pole 340 may be the pole lip 210 and the write pole 205 in FIG. 2. The resulting magnetic head 300 as shown in FIG. 3D has the pole lip 330 having the vertical sides and the bottom surrounded by the conductive layers 308, 312 made of a noble metal, which would not react with oxygen to form an oxide film on the vertical sides and the bottom of the magnetic pole lip 330. During operation of the magnetic head 300, the conductive layer 308 may also be a diffusion barrier that prevents oxygen from migrating from the aperture 304 to the pole lip 330.

Figure 4A:
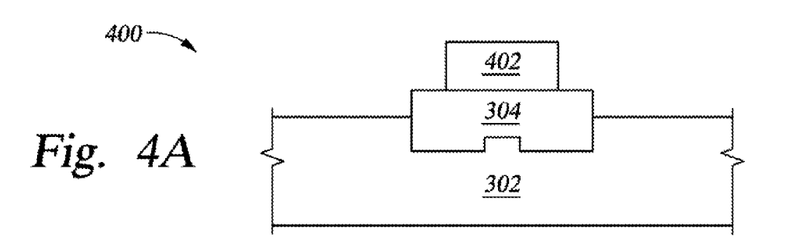
FIGS. 4A-4D are ABS views of a magnetic head at different processing stages according to one embodiment of the invention.
Figure 4B:
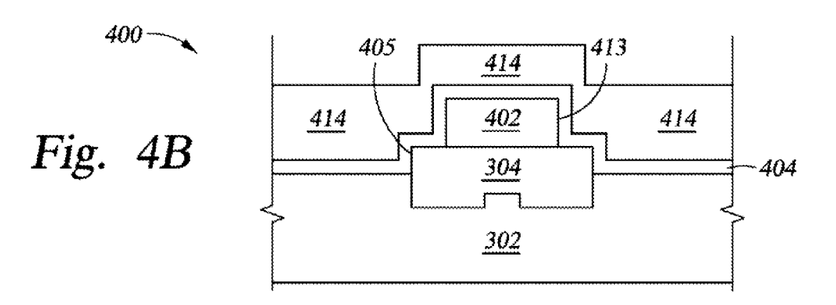

FIGS. 4A-4D are ABS views of a magnetic head 400 at different processing stages according to one embodiment of the invention. FIG. 4A shows the antenna 302, the aperture 304, and a resist 402 coated and lithographically patterned over the aperture 304. Again the resist 402 may be deposited and patterned using any suitable process. Next, as shown in FIG. 4B, a conductive layer 404 is deposited over the antenna 302, a portion of the aperture 304 that is not covered by the resist 402, and the resist 402. Vertical sides 413 of the resist 402 and vertical sides 405 of the aperture 304 are also covered by the conductive layer 404.

The conductive layer 404 may be deposited using any deposition process, such as PVD or ALD and may have a thickness of less than or equal to 10 nm. In one embodiment, the thickness of the conductive layer 404 is about 2 nm. The conductive layer 404 may be a noble metal, such as Au, Rh, Ru, Ir, Pd, Pt, Re, or Os. The conductive layer 404 may also be an alloy having over 95% of one of the noble metals, such as Au, Rh, Ru, Ir, Pd, Pt, Re, or Os.

Prior to depositing the conductive layer 404, an optional seed layer (not shown) may be deposited over the antenna 302, a portion of the aperture 304 that is not covered by the resist 402, and the resist 402. The conductive layer 404 is then deposited over the seed layer. A heat sink 414 is deposited over the conductive layer 404. The heat sink 414 is made of a material having good thermal conductivity, such as Cr, Ir, Pt, Pd, Ru, or Rh, and is deposited using any suitable deposition process, such as physical vapor deposition (PVD).

Figure 4C:
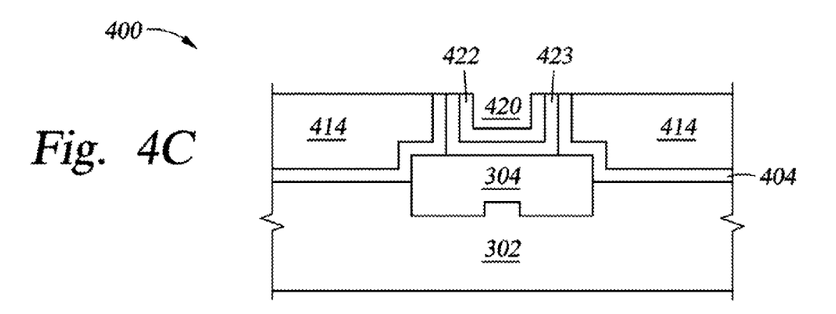

Next, one or more removal processes are performed to form an opening 420, as shown in FIG. 4C. Portions of the heat sink 414 and the conductive layer 404 covering the top surface of the resist 402 are first removed to expose the top surface of the resist 402 by any suitable removal process, such as ion milling. Then the resist 402 is removed by any suitable removal process, such as wet stripping. A second conductive layer 422 is then deposited into the opening 420, covering the vertical sides and the bottom of the opening 420.

The second conductive layer 422 may also have good thermal conductivity and may be made of a noble metal, such as Au, Rh, Ru, Ir, Pd, Pt, Re, or Os. The second conductive layer 422 may also be an alloy having over 95% of one of the noble metals, such as Au, Rh, Ru, Ir, Pd, Pt, Re, or Os. Any suitable deposition process may be used to deposit the second conductive layer 422. One example of such process is ALD. The second conductive layer 422 may have a thickness of less than or equal to 10 nm. In one embodiment, the thickness of the second conductive laser is about 2 nm.

A seed layer 423 may be first deposited into the opening 420, and then the second conductive layer 422 is deposited on the seed layer 423. The seed layer 423 may be any suitable material, such as Ta, NiTa, Cr, Ti or Si. In one embodiment, the seed layer 423 is about 1 nm thick. The conductive layer 404 and the second conductive layer 422 may be the same material or may be different materials. The magnetic head 400 at the current processing stage may not have oxide films formed in the opening 420 since the sides and the bottom of the opening 420 are covered by the second conductive layer 422, which may be a noble metal that would not react with oxygen.

Figure 4D:
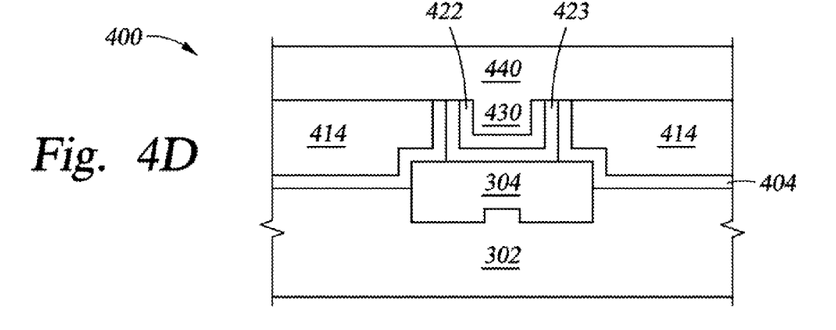

A magnetic material is deposited in the opening 420 and over the heat sink 414. The portion of the magnetic material that is in the opening 420 is the pole lip 430 and the portion of the magnetic material that is over the heat sink 414 and the pole lip 430 is the write pole 440. The pole lip 430 and write pole 440 may be the pole lip 210 and the write pole 205 in FIG. 2. During operation of the magnetic head 400, the second conductive layer 422 may also be a diffusion barrier that prevents oxygen from migrating from the aperture 304 to the pole lip 430.

Figure 5A:
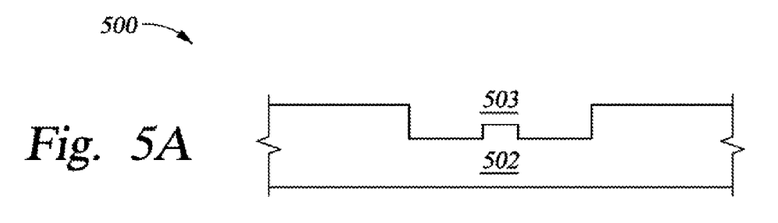
FIGS. 5A-5H are ABS views of a magnetic head at different processing stages according to one embodiment of the invention.
Figure 5B:
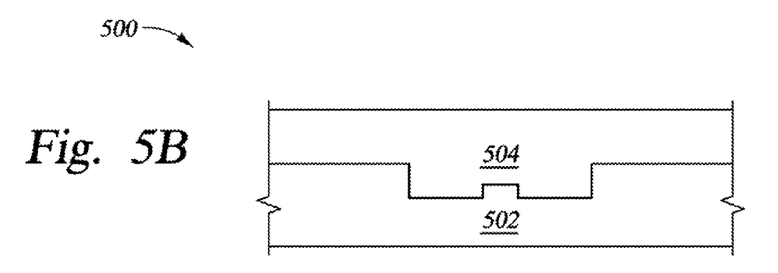
Figure 5C:
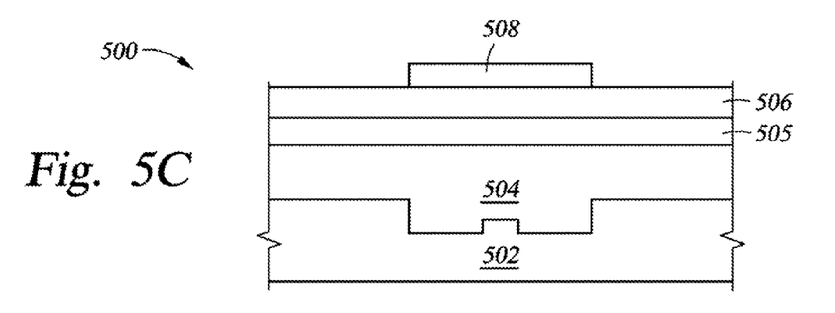

FIGS. 5A-5H are ABS views of a magnetic head 500 at different processing stages according to one embodiment of the invention. FIG. 5A shows an antenna 502 having an opening 503 formed therein. The antenna 502 may be the antenna 220 in FIG. 2. An aperture 504 is deposited into the opening 503 and over the antenna 502, and planarized as shown in FIG. 5B. Next, as shown in FIG. 5C, a seed layer 505 is deposited over the aperture 504. The seed layer 505 may be any suitable material, such as Ta, NiTa, Cr, Ti or Si and has a thickness of about 1 nm.

A conductive layer 506 is deposited on the seed layer 505. The conductive layer 506 may be deposited using any deposition process such as ALD and may have a thickness of less than or equal to 10 nm. In one embodiment, the thickness of the conductive layer 506 is about 2 nm. The conductive layer 506 may be a noble metal, such as Au, Rh, Ru, Ir, Pd, Pt, Re, or Os. The conductive layer 506 may also be an alloy having over 95% of one of the noble metals, such as Au, Rh, Ru, Ir, Pd, Pt, Re, or Os.

Figure 5D:
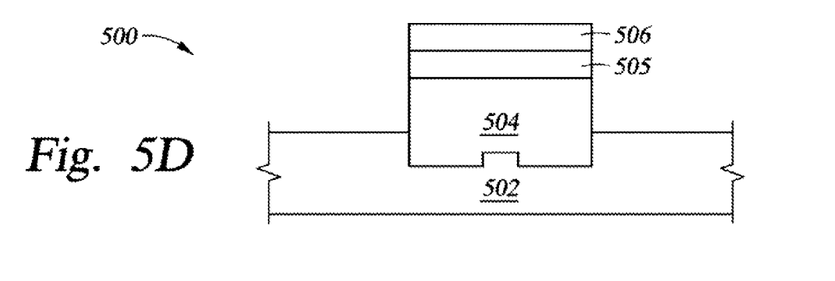

A mask 508 is deposited over the conductive layer 506 and covers a portion of the conductive layer 506. One or more removal processes are performed to remove portions of the conductive layer 506 and aperture 504 not covered by the mask 508. The removal processes may be multiple ion milling processes, multiple reactive ion etching (RIE) processes, or a combination of ion milling and RIE processes. The mask 508 is also removed as the result of the one or more removal processes. The resulting structure, as shown in FIG. 5D, has the aperture 504 exposing portions of vertical sides above the antenna 502, and the seed layer 505 and the conductive layer 506 are disposed over the aperture 504. The aperture 504 may be the aperture 215 in FIG. 2.

Figure 5E:
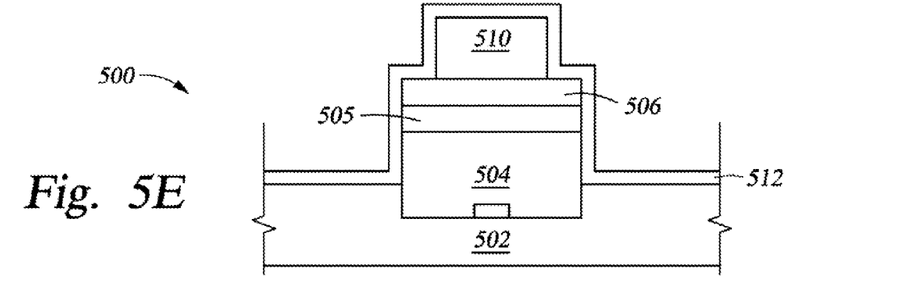

Next, as shown in FIG. 5E, a resist 510 is deposited over the conductive layer 506 and covers a portion of the conductive layer 506. A second conductive layer 512 is deposited over the antenna 502, the conductive layer 506 not covered by the resist 510, and the resist 510. The vertical sides of the resist 510, conductive layer 506, seed layer 505, and aperture 504 are also covered by the second conductive layer 512. The second conductive layer 512 may be deposited using any deposition process, such as ALD and may have a thickness of less than or equal to 10 nm. In one embodiment, the thickness of the second conductive layer 512 is about 2 nm. The second conductive layer 512 may be a noble metal, such as Au, Rh, Ru, Ir, Pd, Pt, Re, or Os. The second conductive layer 512 may also be an alloy having over 95% of one of the noble metals, such as Au, Rh, Ru, Ir, Pd, Pt, Re, or Os.

Figure 5F:
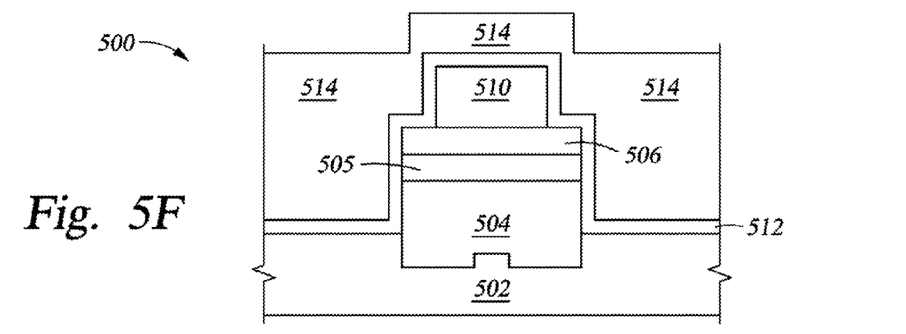

A heat sink 514 is deposited over the second conductive layer 512, as shown in FIG. 5F. The heat sink 514 is made of a material having good thermal conductivity, such as Cr, Ir, Pt, Pd, Ru, or Rh, and is deposited using any suitable deposition process, such as physical vapor deposition (PVD).

Figure 5G:
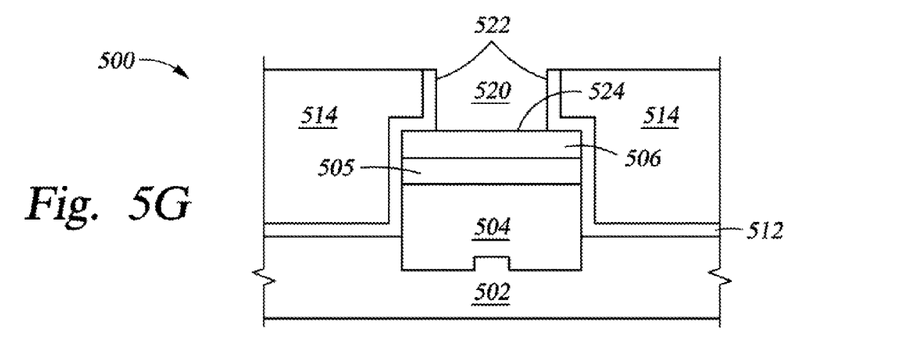

Next, one or more removal processes are performed to form an opening 520, as shown in FIG. 5G. Portions of the heat sink 514 and the second conductive layer 512 covering the top surface of the resist 510 are first removed to expose the top surface of the resist 510 by any suitable removal process, such as ion milling. Then the resist 510 is removed by any suitable removal process, such as wet stripping, to form the opening 520.

The opening 520 has vertical sides 522 and a bottom 524. The vertical sides 522 are the second conductive layer 512 and the bottom 524 is the conductive layer 506. Because both conductive layers 506, 512 may be a noble metal or an alloy of a noble metal, no oxidation may occur at the vertical sides 522 and the bottom 524 of the opening 520. Therefore, no oxide films may be formed on the vertical sides 522 and the bottom 524 of the opening 520 as the magnetic head 500 at the current processing stage is exposed to oxygen.

Figure 5H:
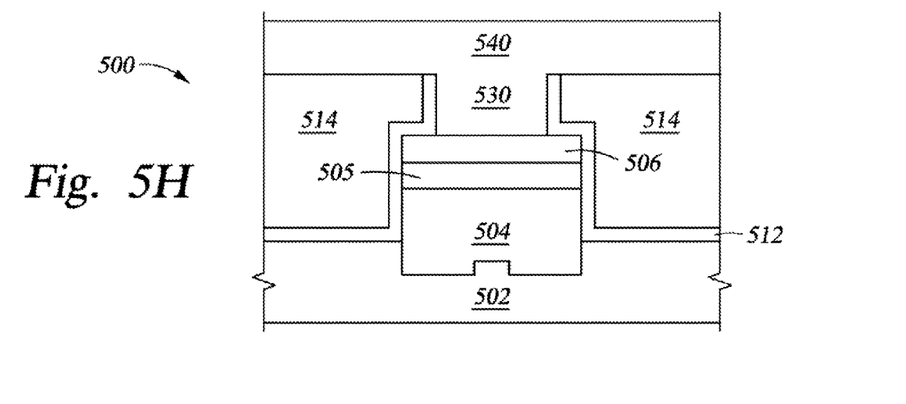

A magnetic material is deposited in the opening 520 and over the heat sink 514, as shown in FIG. 5H. The portion of the magnetic material that is in the opening 520 is the pole lip 530 and the portion of the magnetic material that is over the heat sink 514 and the pole lip 530 is the write pole 540. The pole lip 530 and the write pole 540 may be the pole lip 210 and the write pole 205 in FIG. 2. During operation of the magnetic head 500, the conductive layer 506 may also be a diffusion barrier that prevents oxygen from migrating from the aperture 504 to the pole lip 530.

In summary, an improved magnetic head is disclosed. The magnetic head has a pole lip having the vertical sides and the bottom surrounded by one or more conductive layers made of a noble metal, which would not react with oxygen to form an oxide film on the vertical sides and the bottom of the magnetic lip. Thus, heat is effectively dissipated from the magnetic lip to the heat sink disposed nearby.

While the foregoing is directed to embodiments of the present invention, other and further embodiments of the invention may be devised without departing from the basic scope thereof, and the scope thereof is determined by the claims that follow.

What is claimed is:

1. A heat assisted magnetic recording head, comprising:
   an antenna;
   an aperture disposed over the antenna covering a portion of the antenna;
   a first conductive layer disposed over the antenna and the aperture;
   a magnetic lip disposed over the first conductive layer;
   a second conductive layer disposed over the first conductive layer and over vertical sides of the magnetic lip;
   a heat sink disposed over the second conductive layer; and
   a write pole disposed over the heat sink, the second conductive layer and the magnetic lip.

2. The heat assisted magnetic recording head of claim 1, wherein the first conductive layer comprises a noble metal or an alloy containing over 95% of a noble metal.

3. The heat assisted magnetic recording head of claim 2, wherein the second conductive layer comprises a noble metal or an alloy containing over 95% of a noble metal.

4. The heat assisted magnetic recording head of claim 1, wherein the first conductive layer comprises a material selected from a group consisting of Au, Rh, Ru, Ir, Pd, Pt, Re, Os, and an alloy having over 95% of Au, Rh, Ru, Ir, Pd, Pt, Re, or Os.

5. The heat assisted magnetic recording head of claim 4, wherein the second conductive layer comprises a material selected from the group consisting of Au, Rh, Ru, Ir, Pd, Pt, Re, Os, and an alloy having over 95% of Au, Rh, Ru, Ir, Pd, Pt, Re, or Os.

6. The heat assisted magnetic recording head of claim 1, wherein the first conductive layer and the second conductive layer comprise the same material.

7. The heat assisted magnetic recording head of claim 1, wherein the first conductive layer and the second conductive layer comprise different materials.

\* \* \* \* \*

UNITED STATES PATENT AND TRADEMARK OFFICE
CERTIFICATE OF CORRECTION

PATENT NO. : 8,976,489 B2  
APPLICATION NO. : 13/906777  
DATED : March 10, 2015  
INVENTOR(S) : Balamane et al.

Page 1 of 1

It is certified that error appears in the above-identified patent and that said Letters Patent is hereby corrected as shown below:

In the Specification

Column 1, Line 8, please delete "mention" and insert --invention-- therefor;

Column 3, Line 3, please delete "Over" and insert --over-- therefor;

Column 5, Line 37, please delete "NET" and insert --NFT-- therefor;

Column 6, Line 55, please delete "ma" and insert --may-- therefor;

Column 7, Line 30, please delete "beat" and insert --heat-- therefor;

Column 8, Line 2, please delete "haying" and insert --having-- therefor;

Column 8, Line 23, please delete "laser" and insert --layer-- therefor.

Signed and Sealed this  
Eleventh Day of August, 2015

Michelle K. Lee  
*Director of the United States Patent and Trademark Office*